United States Patent
Okamoto et al.

(10) Patent No.: US 6,429,917 B1
(45) Date of Patent: Aug. 6, 2002

(54) COLOR LIQUID-CRYSTAL PANEL HAVING A FRAME-SHAPED BLACK MATRIX AND MANUFACTURING PROCESS THEREFOR

(75) Inventors: Mamoru Okamoto; Yuji Yamamoto; Michiaki Sakamoto; Shinichi Nakata; Hironori Kikkawa; Takahiko Watanabe; Hirofumi Ihara, all of Tokyo (JP)

(73) Assignee: NEC Corporation (JP)

( * ) Notice: Subject to any disclaimer, the term of this patent is extended or adjusted under 35 U.S.C. 154(b) by 0 days.

(21) Appl. No.: 09/513,758

(22) Filed: Feb. 25, 2000

(30) Foreign Application Priority Data

Mar. 3, 1999 (JP) .............................. 11-055478

(51) Int. Cl.[7] ...................... G02F 1/1333; G02F 1/1335
(52) U.S. Cl. ...................... 349/110; 349/111; 349/122; 349/138; 349/106
(58) Field of Search ................................ 349/106, 110, 349/111, 138, 122

(56) References Cited

U.S. PATENT DOCUMENTS

| | | | | |
|---|---|---|---|---|
| 5,327,001 A | * | 7/1994 | Wakai et al. | 257/350 |
| 5,446,562 A | * | 8/1995 | Sato | 359/59 |
| 5,739,880 A | * | 4/1998 | Suzuki et al. | 349/110 |
| 5,818,550 A | * | 10/1998 | Kadota et al. | 349/43 |
| 5,933,208 A | * | 8/1999 | Kim | 349/106 |
| 6,002,462 A | * | 12/1999 | Sato et al. | 349/106 |
| 6,038,006 A | * | 3/2000 | Sasaki et al. | 349/106 |
| 6,118,505 A | * | 9/2000 | Nagata et al. | 349/106 |

FOREIGN PATENT DOCUMENTS

| | | | |
|---|---|---|---|
| JP | 2-296223 | 12/1990 | G02F/1/1339 |
| JP | 4-342229 | 11/1992 | G02F/1/1335 |
| JP | 5-88189 | 4/1993 | G02F/1/1339 |
| JP | 09-146084 A | * 6/1997 | |
| JP | 09-160015 A | * 6/1997 | |
| JP | 10-39292 | 2/1998 | G02F/1/1335 |
| JP | 10-325951 A | * 12/1998 | |
| JP | 11-133404 A | * 5/1999 | |
| JP | 11-212045 A | * 8/1999 | |
| JP | 11-295744 A | * 10/1999 | |

* cited by examiner

Primary Examiner—William L. Sikes
Assistant Examiner—Tarifur R. Chowdhury
(74) Attorney, Agent, or Firm—Hayes Soloway P.C.

(57) ABSTRACT

This invention provides a color liquid-crystal panel comprising the first substrate having pixel electrodes on which are formed a thin-film transistor as a switching element for each pixel, which is covered by a passivation film, and a color filter layer and a black matrix on the passivation film, which are covered by an overcoat layer, and where the first substrate and the second substrate having a transparent common electrode facing the first substrate are put together via a sealer, forming an inner space which is filled with a liquid-crystal material, wherein a frame-shaped black matrix is formed on the first substrate, covering the periphery of the first substrate.

18 Claims, 12 Drawing Sheets

COLOR LIQUID-CRYSTAL PANEL HAVING A FRAME-SHAPED BLACK MATRIX AND MANUFACTURING PROCESS THEREFOR

BACKGROUND OF THE INVENTION

1. Field of the Invention

This invention relates to a color liquid-crystal panel and a manufacturing process therefor. In particular, it relates to a color liquid-crystal panel comprising a switching element such as a thin-film transistor (TFT), a color filter and a black matrix on a single substrate.

2. Description of the Prior Art

A color liquid-crystal panel is conventionally constituted by first substrate 1 having a switching element such as a TFT comprising a gate electrode 2, a gate insulating film 3, a semiconductor layer 4 and source-drain electrodes 5 and 6, interconnection layers to the individual electrodes (not shown), all of which are covered by an interlayer film 7, pixel electrodes 11 to individual pixels, which are covered by a passivation film 12, an oriented film 18*a*, and a terminal 13 for interconnection with an external circuit; and a second substrate 16 comprising a black matrix 8, color filter layers 10R, 10G and 10B for individual colors R, G and B, respectively, a transparent common electrode 17 such as an ITO, and an oriented film 18*b*, where these substrates are put together via an intervening spacer 14 for ensuring a given gap between them and a sealer 15 surrounding their peripheries in a manner that their device-forming surfaces face, as shown in FIG. 11. Then, the sealer is burned, a gap between both substrates is determined and then a liquid-crystal material 19 is poured into the panel.

Liquid crystal may be injected by, e.g., a two-hole method where two holes are formed in selected places in the panel and liquid crystal is injected from one hole while the panel is vacuumed from the other hole to facilitate feeding the liquid crystal, or a vacuum-injection method where an empty cell having an inlet and liquid crystal are vacuumed to $1 \times 10^{-2}$ to $1 \times 10^{-4}$ Torr to deposit the liquid crystal around the inlet and then the vacuum of the system is gradually broken to the atmospheric pressure so that a pressure difference between the inside and the outside of the liquid-crystal cell induces transfer of the liquid crystal into the inside of the cell. The latter method has been predominantly employed.

After injecting liquid crystal, the inlet is sealed and then polarizing plates 20*a* and 20*b* are attached to the outer faces of the substrates to provide a liquid-crystal panel.

To improve definition of a liquid-crystal panel, it is necessary to provide a higher pixel density. A conventional liquid-crystal panel where a color filter and a black matrix are disposed on a substrate facing to an active-matrix substrate must be manufactured with a given margin for an alignment error which may occur during an assembling process. It has been, therefore, difficult to ensure the maximum area of the pixel opening (opening ratio).

Thus, there has been proposed a method where a color filter and a black matrix are formed on an active-matrix substrate comprising a switching element such as a TFT (CF-on-TFT; hereinafter, referred to as "COT").

Due to forming a color filter and a black matrix on a COT substrate, it is not necessary to consider an assembling margin, leading to a more simplified manufacturing process and increase in a pixel opening ratio.

However, forming a color filter or black matrix directly on a TFT or an interconnection may cause malfunctioning of the switching element because elements or ions in the color filter or black matrix enter into the main component of the switching element. Thus, JP-A 10-39292 has proposed that a protective film, i.e., a passivation film, is formed between a switching element and a color filter.

SUMMARY OF THE INVENTION

An object of this invention is to disclose a specific structure for such a COT type of liquid-crystal panel. The above application (JP-A 10-39292 has not described an edge structure for a liquid-crystal panel.

This invention provides a color liquid-crystal panel comprising the first substrate having pixel electrodes on which are formed a thin-film transistor as a switching element for each pixel, which is covered by a passivation film, and a color filter layer and a black matrix on the passivation film, which are covered by an overcoat layer, and where the first substrate and the second substrate having a transparent common electrode facing the first substrate are put together via a sealer, forming an inner space which is filled with a liquid-crystal material, wherein a frame-shaped black matrix covers the periphery of the first substrate.

According to this invention, a liquid-crystal panel suitable for a COT configuration can be provided.

DETAILED DESCRIPTION OF PREFERRED EMBODIMENTS

This invention will be detailed with reference to the drawings.

First Embodiment

Figure 1:
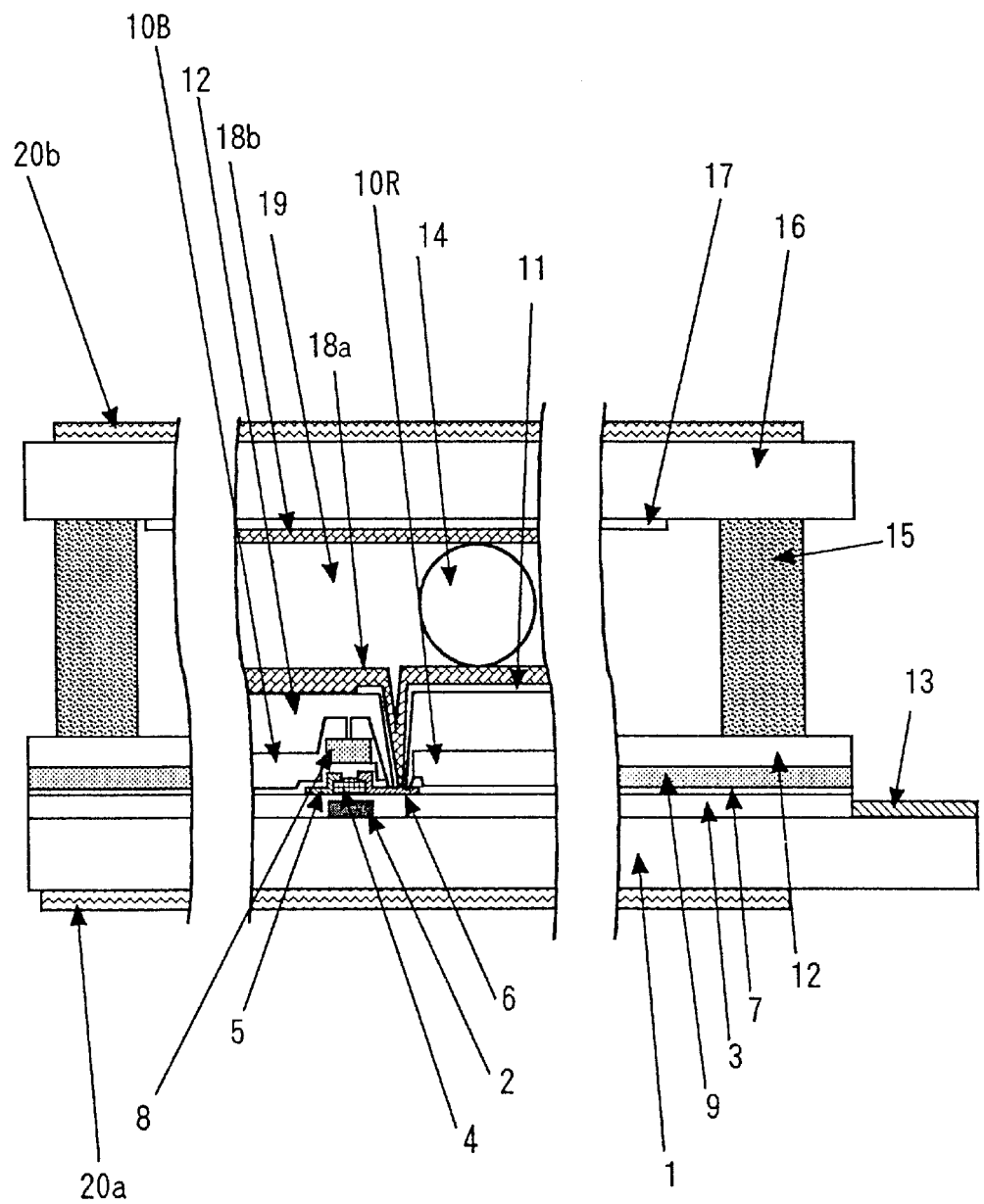
FIG. 1 is a schematic cross section illustrating the first embodiment of this invention.

FIG. 1 is a schematic cross section showing a liquid-crystal panel according to an embodiment of this invention, where 1 is a first substrate made of a transparent insulating material such as a glass substrate, on which a TFT as a switching element is formed. The TFT consists of a gate electrode 2, a gate insulating film 3 on the gate electrode 2, a source electrode 5, a drain electrode 6 and a semiconductor layer (e.g., amorphous silicon) 4 between the source and the drain electrodes.

The switching element is covered by a passivation film 7, e.g., a silicon nitride (SiN$_x$) film. Above the semiconductor layer 4 are formed a black matrix (BM) 8 and color filters (CF) 10 consisting of the three primary colors, red (R), blue (B) and green (G) corresponding to individual pixels. In the periphery of the COT substrate, a frame-shaped BM 9 is formed on the passivation film. Although a material for the frame-shaped BM 9 may be the same as or different from that for the BM 8, it is preferable to use the same material for a more simplified manufacturing process.

The BM and the CF are covered by an overcoat 12, on which a pixel electrode 11 made of a transparent conductive material such as ITO is formed in each pixel. The pixel electrode 11 is connected with the drain electrode 6 via a contact hole formed in the overcoat 12. In the edge of the COT substrate is formed a terminal 13 for interconnection with an external circuit.

In the second opposing substrate 16, a transparent common electrode 17 such as ITO, is formed over the whole display area. On the facing surfaces of the substrates are deposited oriented films 18, which are rubbed to a given direction.

Between the substrates, a spacer 14 is appropriately placed for ensuring a given gap, and then these substrates are put together via a sealer in a manner that the transparent electrodes face each other.

Second Embodiment

In the above embodiment, when the frame-shaped black matrix is formed on the edge of the substrate and liquid crystal is injected by, e.g., a vacuum injection method, the seal is subject to a load due to bending of the substrate during breaking the vacuum of the system to the atmospheric pressure, and thus if the black matrix does not adequately adhere to the passivation film, the film may be peeled. A method to solve the problem will be described.

Figure 2:
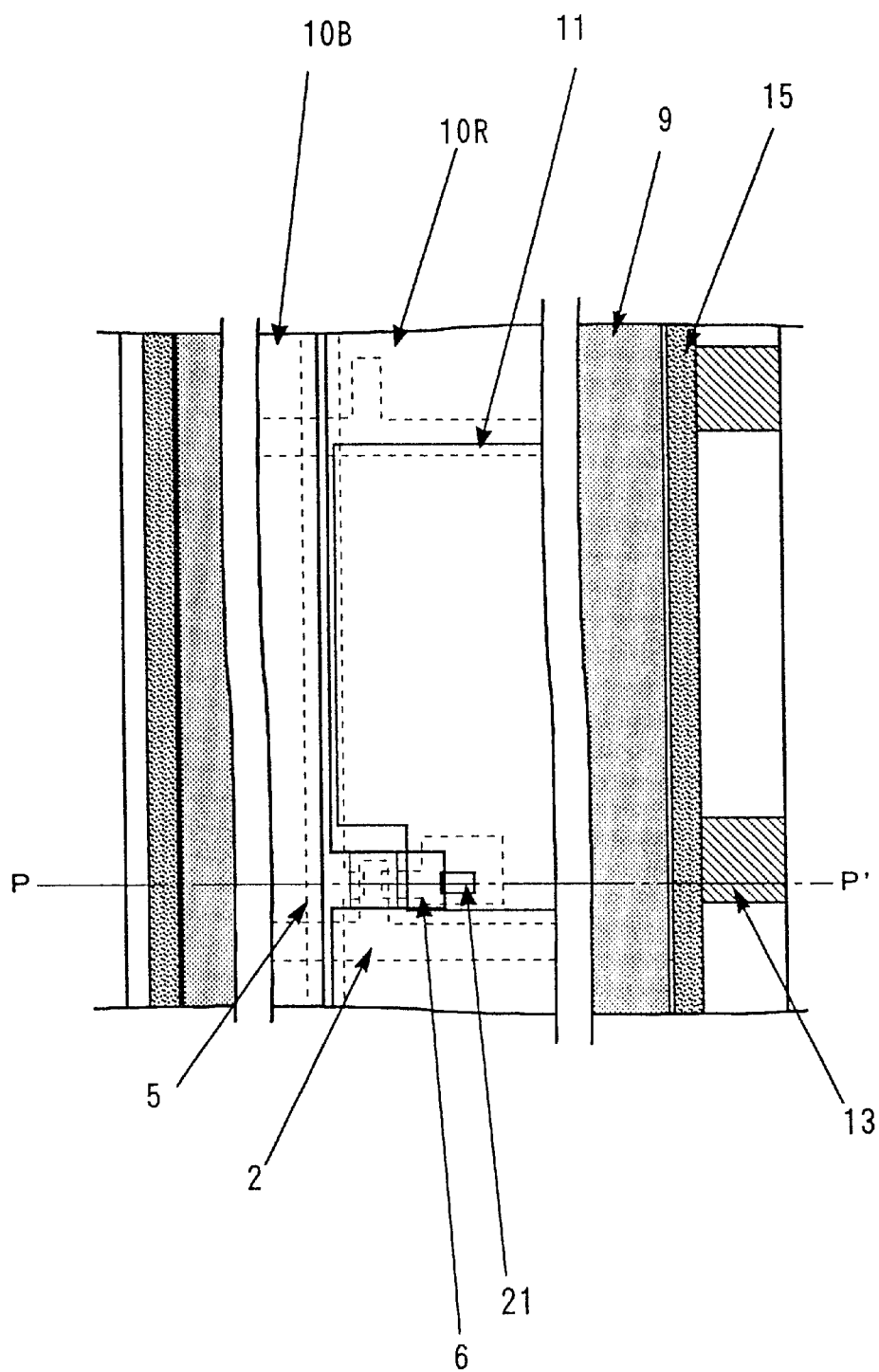
FIG. 2 is a plan view of a pixel and an edge for a liquid-crystal panel according to the second embodiment of this invention.
Figure 3:
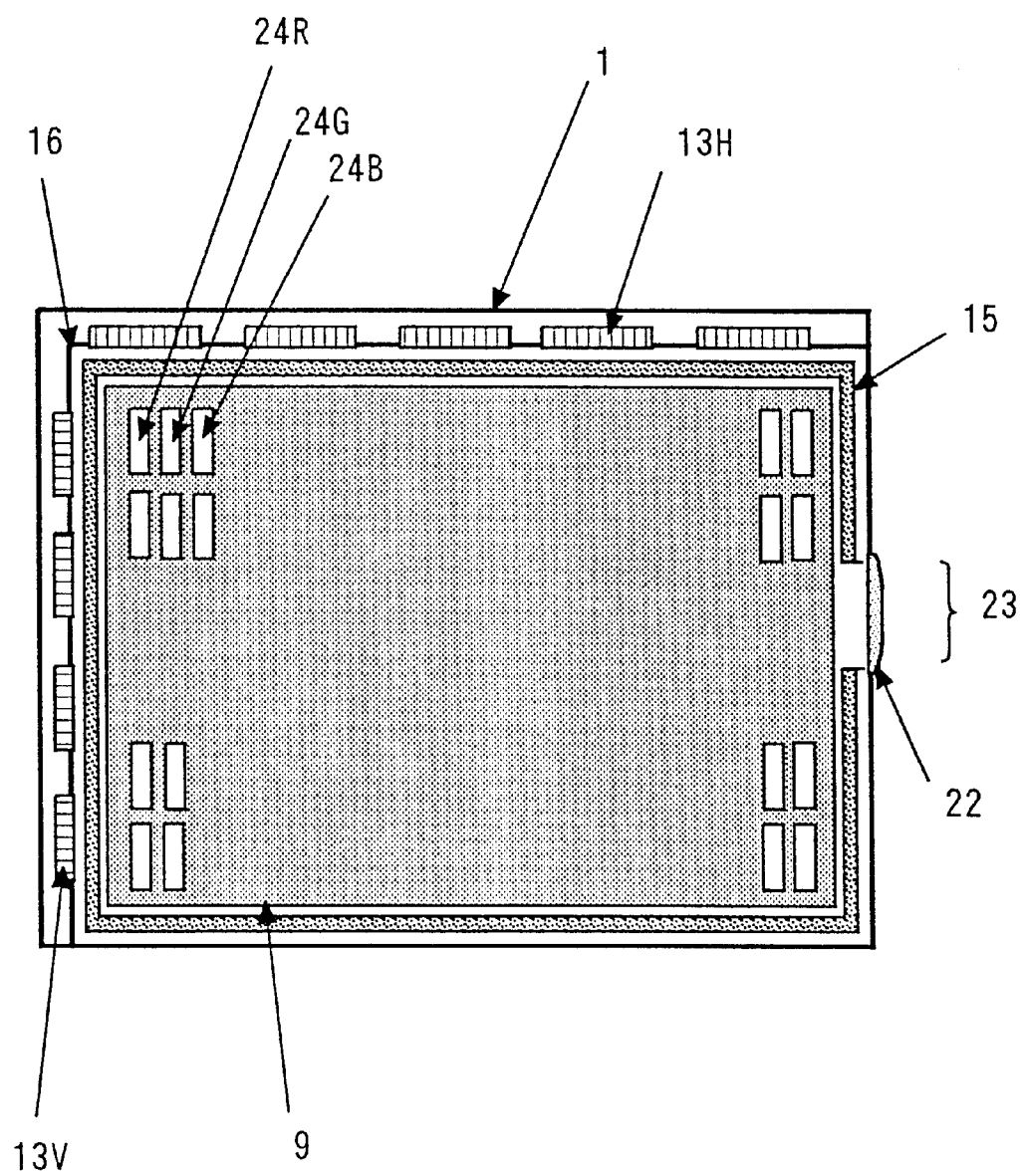
FIG. 3 is a schematic plan view illustrating the whole liquid-crystal panel according to the second embodiment of this invention.
Figure 4:
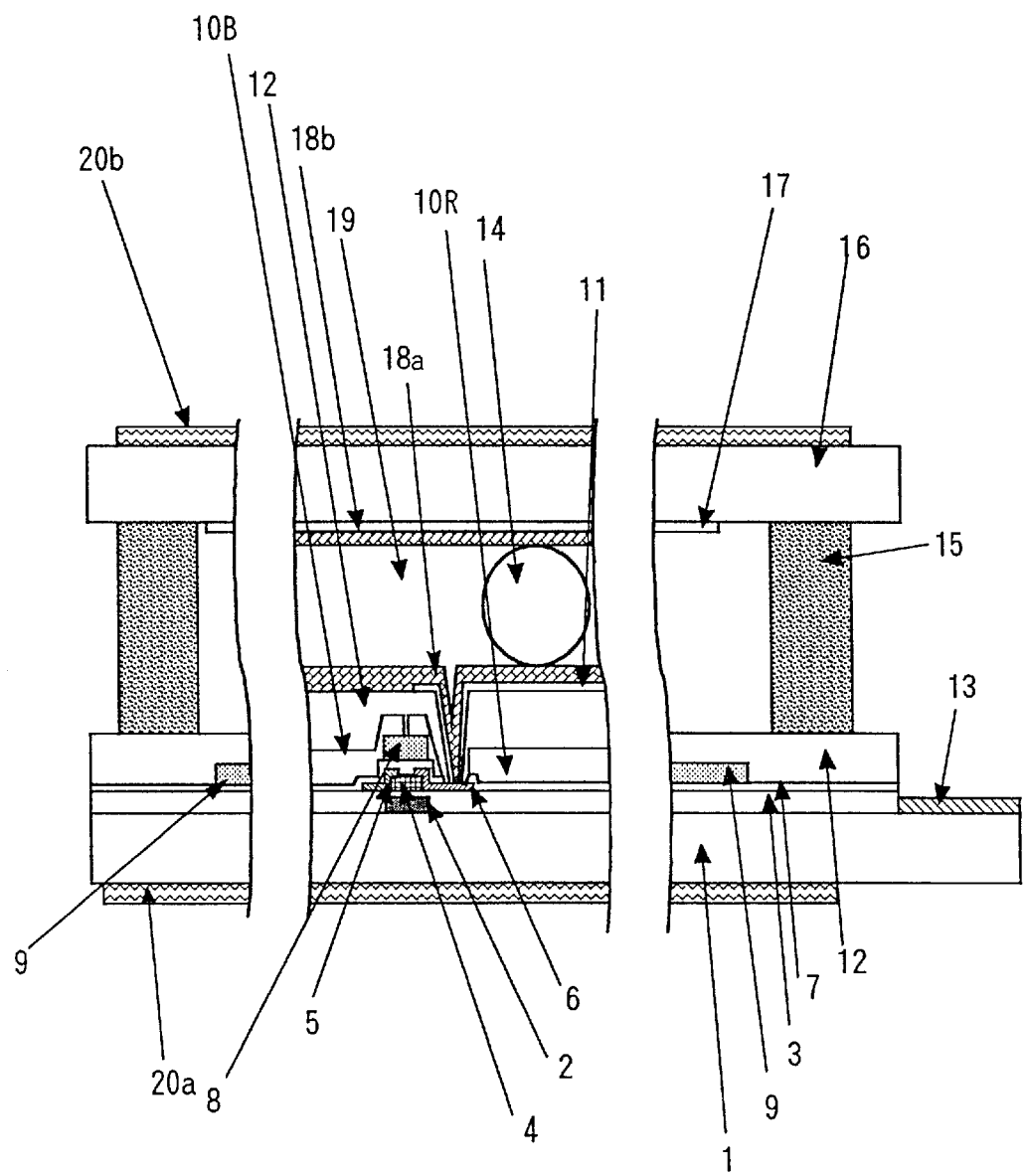
FIG. 4 is a schematic cross section showing an example for a liquid-crystal panel according to the second embodiment.

FIGS. 2 to 4 illustrates the first example for solving the problem of film peeling in the seal. FIG. 2 is a plan view of a pixel, FIG. 3 is a plan view of the whole panel, and FIG. 4 is a cross section taken on line P–P' in FIG. 2. The panel is different from the embodiment illustrated in FIG. 1, in that the frame-shaped BM 9 on the periphery of the first substrate I is formed inside the area for the sealer 16. In other words, in the first substrate 1 under the sealer 15, an overcoat 12 is formed directly on the passivation film 7 to improve adhesiveness in the sealer area than the embodiment shown in FIG. 1.

Figure 5A:
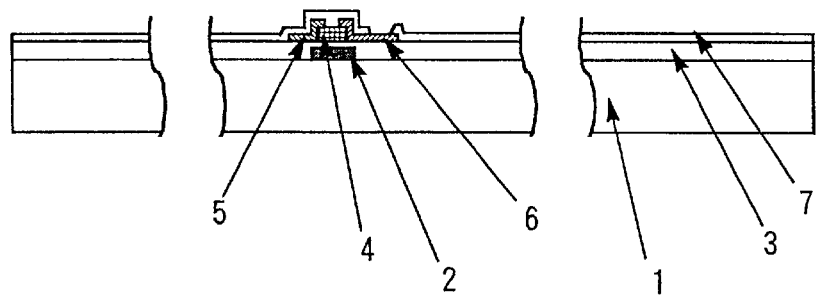
FIGS. 5(*a*)–(*g*) are process cross sections illustrating the first half of a manufacturing process for a liquid-crystal panel according to the second embodiment of this invention.

FIGS. 5(a)–(g) are process cross sections illustrating a manufacturing process for a liquid-crystal panel according to this embodiment. As shown in FIG. 5(a), a TFT is formed on the first substrate made of a transparent insulating material such as a no-alkali glass having 0.7 or 1.1 mm in thickness. The TFT may be formed as follows. First, on the first substrate 1 is deposited a metal material such as Al, Mo and Cr to a thickness of 100 to 400 nm by, e.g., sputtering which is then patterned into a desired shape of gate electrode 2 by photolithography. On the gate electrode 2 and the first substrate 1 is deposited a laminated film of SiO$_x$ and SiN$_x$ as a gate insulating film 3 to a thickness of about 100 to 200 nm by, e.g., a CVD technique. Then, amorphous silicon is deposited as a semiconductor layer 4 to a thickness of about 400 nm, and it is patterned into a desired shape. On the substrate is then deposited a metal material such as Al, Mo and Co to be source and drain electrodes to a thickness of 100 to 400 nm by, e.g., sputtering and the film is patterned into a desired shape of each electrode by photolithography. These are covered by a passivation film 7 made of silicon nitride (SiN$_x$) to a thickness of about 100 to 200 nm. The passivation film may be made of an inorganic material such as silicon nitride or a transparent resin such as epoxy and acrylic resins.

Figure 5B:
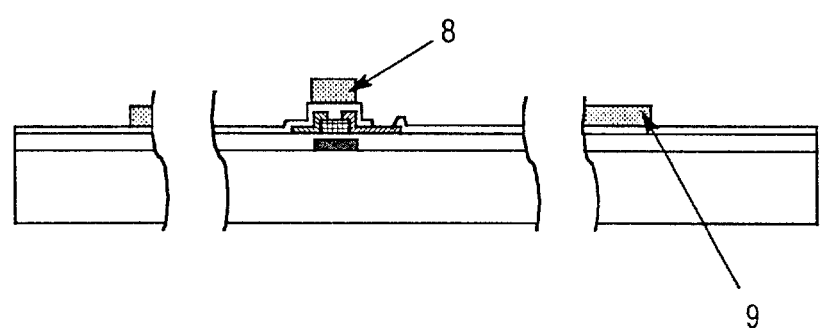
Figure 5C:
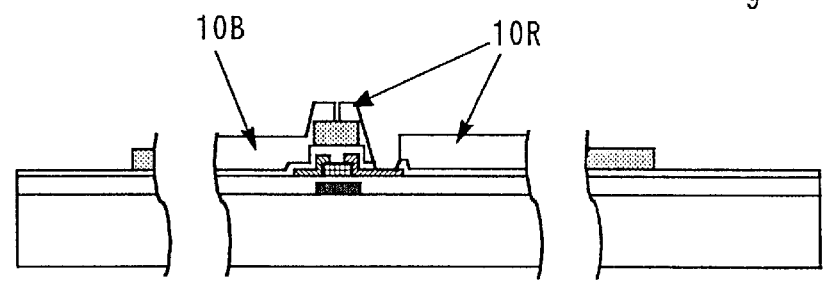

Then, as shown in FIG. 5(b), a BM 8 is formed over the TFT for shielding the semiconductor layer 4 and a frame-shaped BM 9 is formed for preventing a leak of light from the panel periphery. The BM may be formed by applying a negative photosensitive acrylic resist in which a pigment with a shielding property is dispersed (for example, OPTMER CR® series, JSR) or a carbon-based resist to a thickness of about 1 to 3 $\mu$m; exposing it into a desired BM shape and developing it. Desirable properties for the BM are an optical density (OD) of at least 3 and a sheet resistance of at least $10^{10}$ $\Omega/$.

Then, as shown in FIG. 5 (c), a CF 10 is formed for each pixel. For example, on the substrate is applied a negative photosensitive color resist made of an acrylic resin in which a red pigment is dispersed (for example, OPTMER CR® series, JSR) by spin-coating while adjusting a spinning rate to give a thickness of about 1.0 to 1.5 $\mu$m. Then, the substrate is pre-heated on a hot plate at 80° C. for 2 min, exposed and developed with a TMAH (tetramethylammonium hydroxide) solution to form a red CF (10R) on a corresponding area. During the process, an opening is formed in the area where a contact hole 21 is to be formed for interconnecting the drain electrode 6 with the pixel electrode 11 in a subsequent step. The opening has a size encompassing at least the contact hole. Then, the substrate is heated in a clean oven at 220° C. for 60 min, to cure the red color filter 10R.

Green and blue CFs 10G and 10B are formed as described for the red CF (10R). These CFs may be adjacently formed in sequence and thus there are no limitations for their order. In FIG. 3, an opening corresponding to each pixel is indicated by the symbol 24.

Figure 5D:
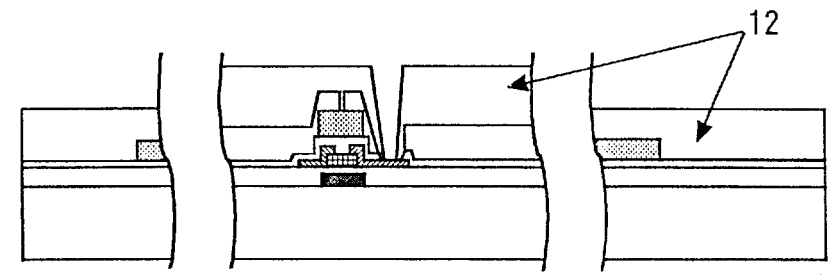

Then, as shown in FIG. 5(d), after forming CFs 10, on the substrate is applied, e.g., a novolak type positive photosensitive resist (for example, OPTMER PC® series, JSR) for flattening the surface. It is then exposed and developed to give a pattern having an opening in the area for a contact hole, and then heated to be cured at 220° C. for 60 min to form an overcoat layer 12.

Figure 5E:
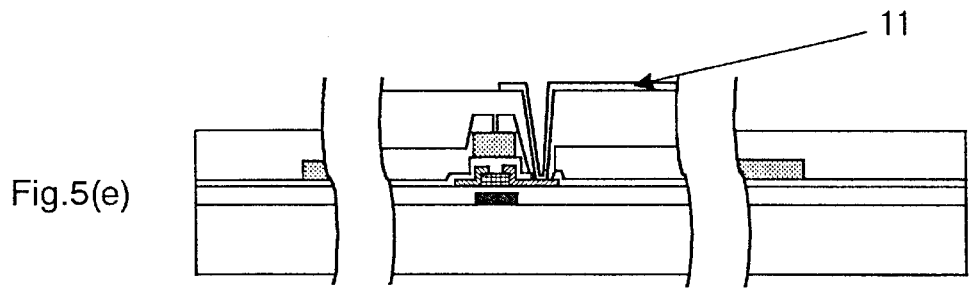

Then, as shown in FIG. 5(e), over the overcoat layer 12 and the drain electrode 6 exposed from the contact hole is deposited a transparent conductive film made of, e.g., ITO by sputtering, which is then patterned to give a pixel electrode 11. In the process, the thicker the film is, the better coverage is, but the thickness may be preferably about 60 to 120 nm in the light of processability of the ITO film as a transparent conductive film.

Figure 5F:
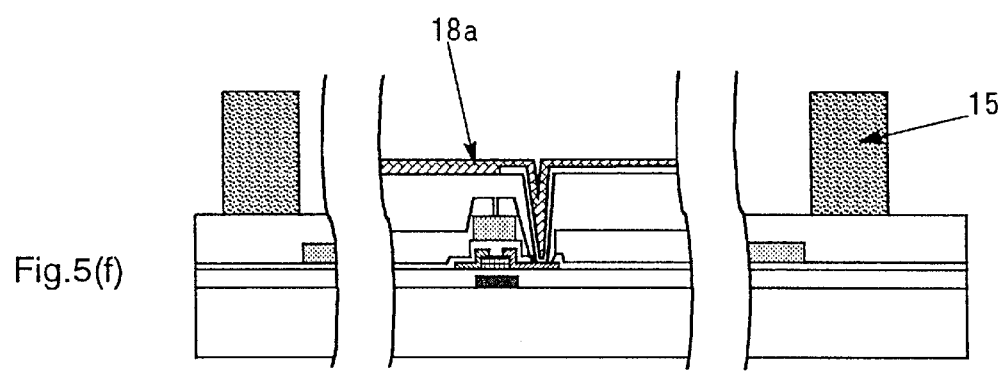

Then, over all the surface is applied a polyimide orienting agent (e.g., SUNEVER® series, Nissan Kagaku or OPTMER AL® series, JSR) by, for example, spin-coating, which is then heated at 200° C. or lower. The surface layer of the oriented film 18a is rubbed to a given direction for achieving a desired pre-tilt angle. Rubbing may be conducted by pushing the oriented film against a rubbing roll on which a conductive synthetic fiber such as viscose rayon is wrapped, and by moving it while adjusting pressure, rotation rate, rotation direction and angle. Thus, a COT substrate may be formed. Then, as shown in FIG. 5(f) a sealer 15 is placed on the periphery of the substrate by screen printing or dispenser application. The sealer 15 may be, for example, an epoxy resin adhesive (e.g., STRUCTBOND® series, Mitsui Chemicals, Inc.). There are no limitations for the width of the sealer as long as it can give sufficient adhesive strength and prevent a leak of liquid crystal injected. It is herein about 1.5 mm.

Figure 5G:
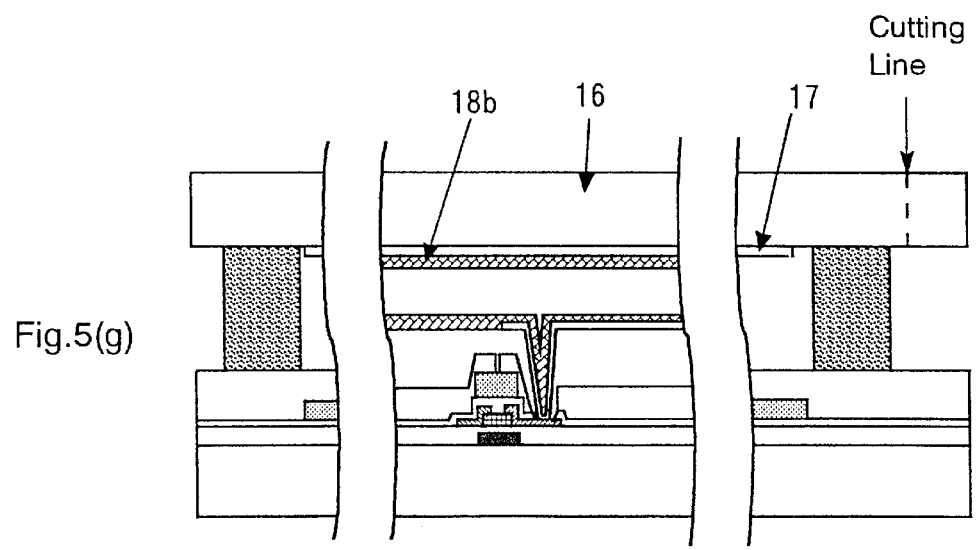

Then, on the four corners of the sealer is applied a transfer made of an Epoxy resin containing silver powder, and a separately-prepared opposing substrate is adhered as shown in FIG. 5(g). It is then burned for curing the sealer. The opposing substrate may be prepared by forming an opposing transparent common electrode 17 made of ITO on the second substrate 16 made of no-alkali glass having 0.7 or 1.1 mm in thickness by, for example, sputtering and forming an oriented film 18b as described above. Before putting the substrates together, a spacer 14 is applied on the opposing substrate to ensure a given gap between them. As a spacer 14, micro-pearls made of a divinylbenzene cross-linked polymer with a size of 4.5 to 5.5 $\mu$m are placed in the display area while micro-rods made of glass fiber with a size of about 5 to 7 $\mu$m in the periphery of the substrate.

Then, these substrates are cut into plates with a desired size (scrive break), during which the opposing substrate is cut into smaller parts than the first substrate 1 for exposing the H-side and the V-side terminals 13H, 13V as shown in the plan view of FIG. 3. When there is a transparent common electrode 17 made of ITO on the cutting line, cutting chips of ITO may adhere to the terminal 13 on the first substrate, which may cause short-circuit between the terminals. Thus, it is preferable in this invention to perform patterning in advance so that the transparent common electrode 17 is not on the cutting line. The ITO film may be patterned by any of known techniques such as photolithography and mask sputtering. Furthermore, although the ITO film may be formed in the area for a sealer as long as it is not on the cutting line, it is preferably formed inside the sealer area in the light of adhesiveness.

A liquid crystal material is injected into the liquid-crystal cell thus prepared. The liquid crystal may be injected by a vacuum injection technique comprising the steps of placing the liquid-crystal cell in a vacuum chamber where a desired degree of vacuum can be obtained; evacuating the inside of the cell; applying the liquid-crystal material on the unsealed inlet 23 as shown in the plan view of FIG. 3; and gradually breaking the vacuum of the system to the atmospheric pressure. In this embodiment, the vacuum of the system was broken from a reduced pressure of about $1\times10^{-4}$ Torr by gradually introducing nitrogen gas and a fluorine-containing compound, e.g., LIXON® series, Chisso Petrochemicals was used as the liquid crystal material. After injecting the liquid crystal, the inlet 23 is closed with a sealer 22 such as an acrylate type of UV curing resin.

Finally, polarizing plates 20a, 20b are attached to the outer surfaces of the substrates to provide a liquid-crystal panel as shown in FIG. 4. The polarizing plate may be an iodine-containing polarizing plate (e.g., NPF® series, Nitto Denko, or SUMIKALAN® series, Sumitomo Chemical Co. Ltd.).

Figure 6:
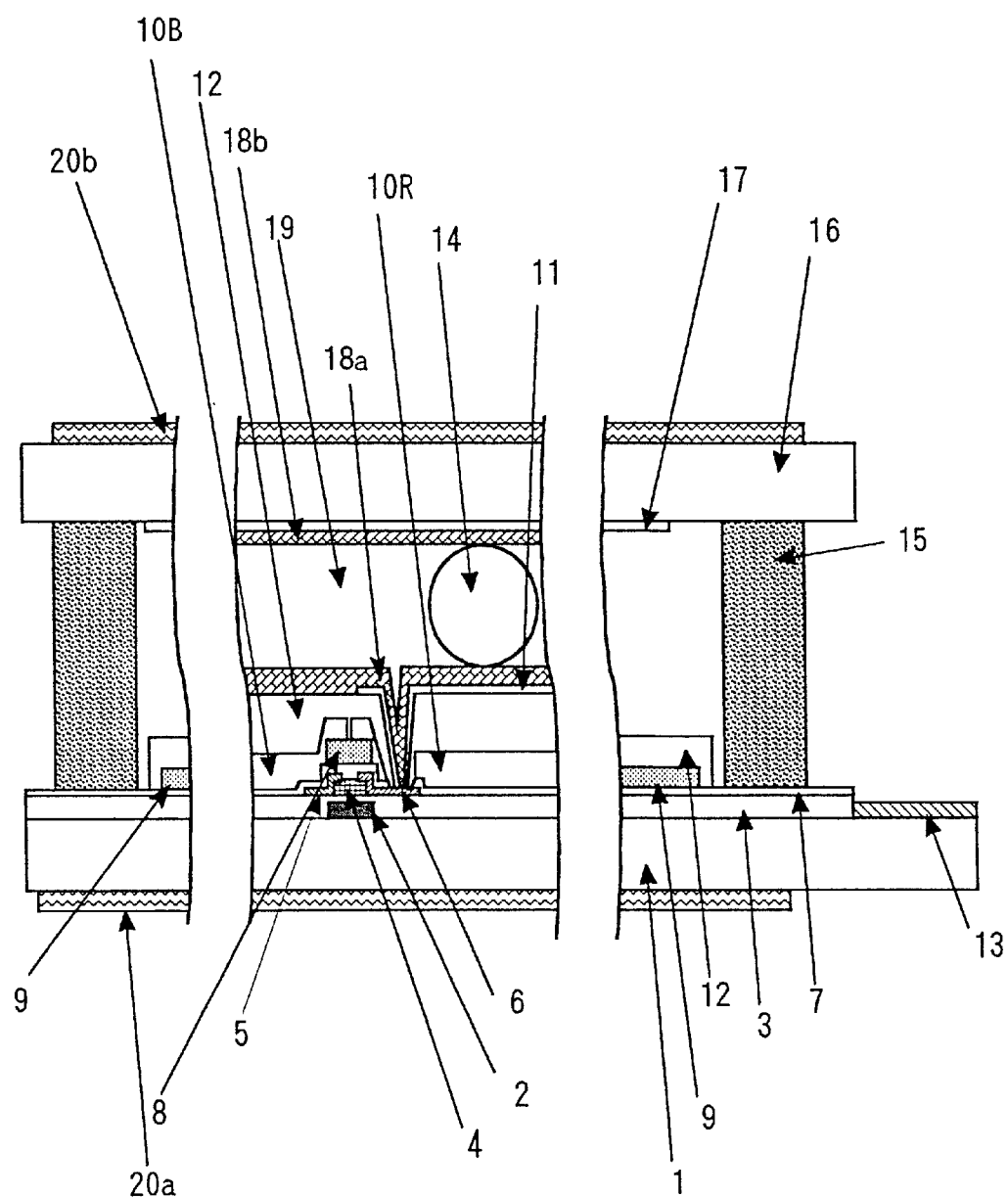
FIG. 6 is a schematic cross section showing another example for a liquid-crystal panel according to the second embodiment.

In a more preferable example of this embodiment, the overcoat 12 is also not formed on the area for a sealer as shown in FIG. 6. Comparing the overcoat 12 made of an organic material-and the passivation film 7 made of an inorganic material, an adhesion strength to a sealer is about 80 kgf for the overcoat 12 while about 110 kgf for the passivation film 7. That is, the latter has an about 1.4-fold peel strength than the former.

Third Embodiment

Figure 7:
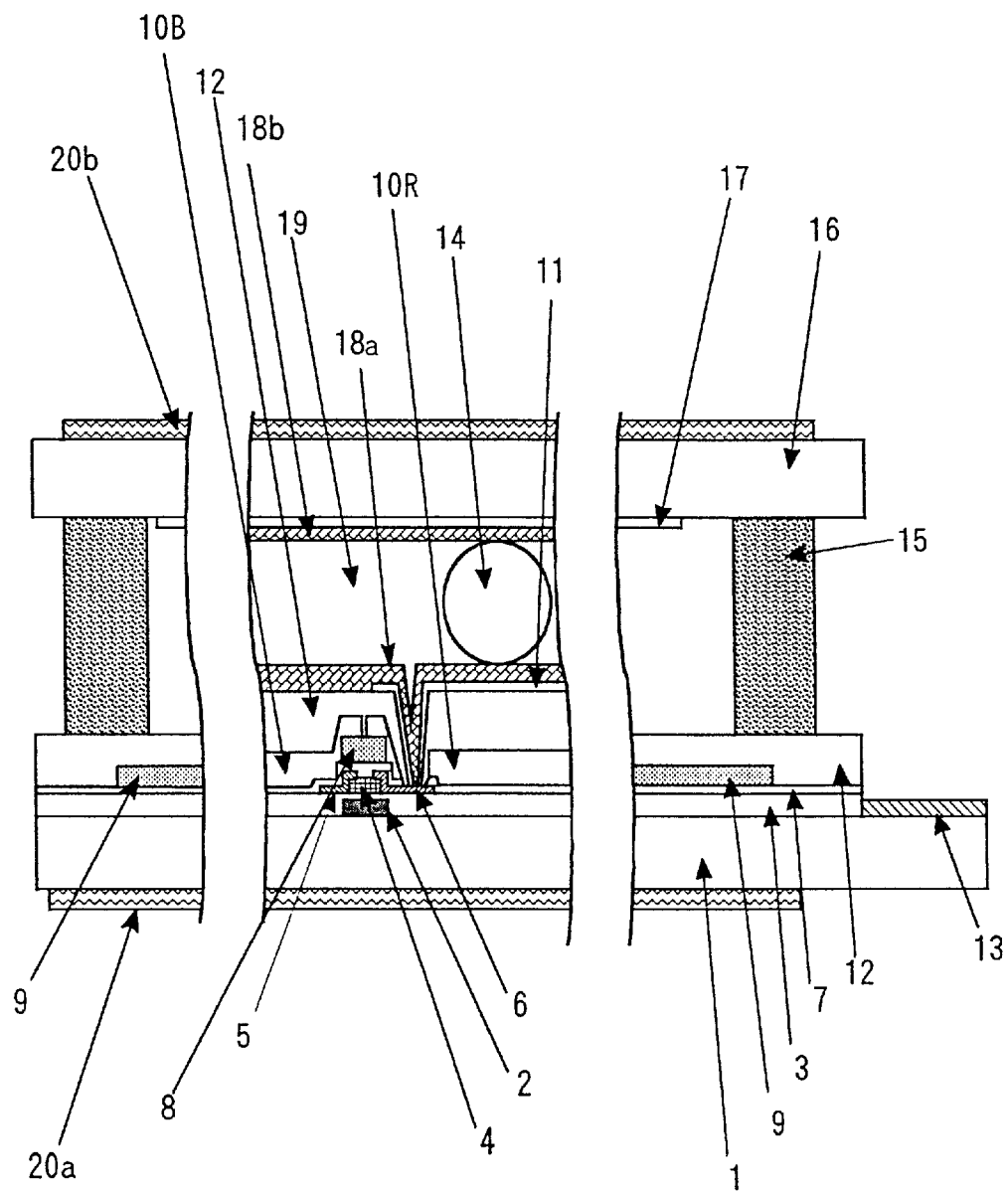
FIG. 7 is a schematic cross section showing a liquid-crystal panel according to the third embodiment.
Figure 8:
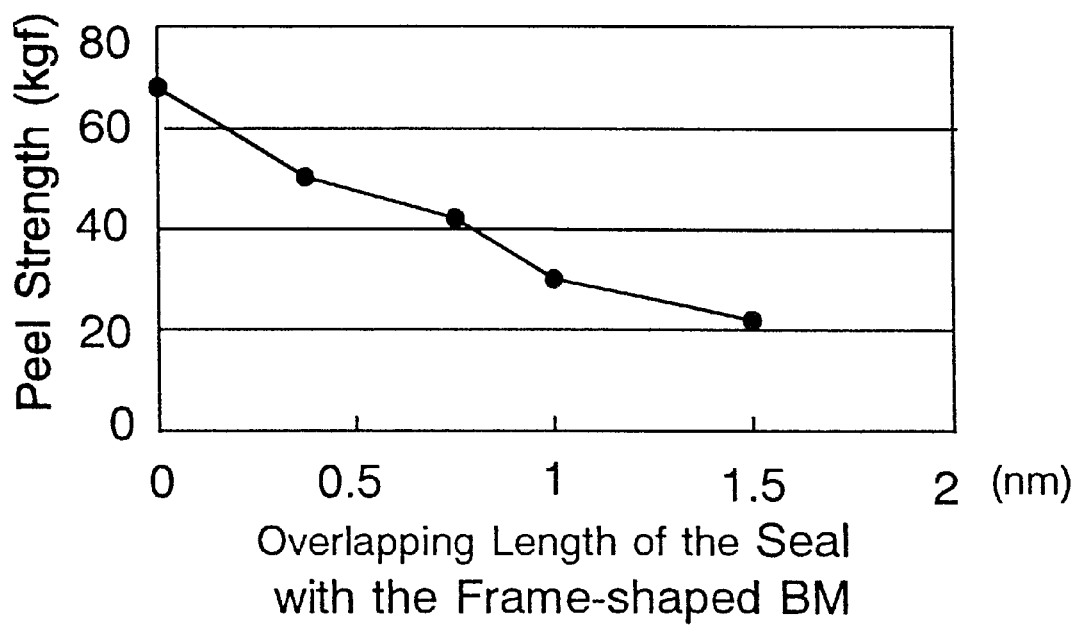
FIG. 8 is a graph illustrating a relationship between an overlap length of a sealer with a frame-shaped black matrix and a peel strength.

In the second embodiment, a frame-shaped BM 9 is not formed in the area for a sealer. It is, therefore, required to cover the panel with a shield case with a liquid-crystal display window for preventing a leak of light from its periphery, resulting in increase of a final overall size of the liquid-crystal display in relation to the display area. Thus, there will be described a means for preventing a light leakage from the panel periphery by forming a frame-shaped BM 9 on a part of the area for a sealer as illustrated in FIG. 7. There has been described that forming a frame-shaped BM 9 in the area for a sealer may reduce adhesion strength, causing film peeling. After further investigation, it has been found that peel strength depends on an overlapping length between the sealer and the frame-shaped BM. FIG. 8 shows the measurement results for peel strength vs a length of a frame-shaped BM from the inside of a substrate overlapping with a sealer 1.5 mm in width. Peel strength of at least 40 kgf is required to prevent film peeling. From the results, an adequate strength may be achieved with an overlapping length of 0.75 mm or less, i.e., a half or less of the width of the sealer, 1.5 mm. Thus, in the area for a sealer in the edge of the first substrate, the BM is formed except the area from the edge of the substrate to at least a half of the width of the sealer. In the second embodiment (FIG. 4), an overlapping length is 0 mm.

Fourth Embodiment

Figure 9:
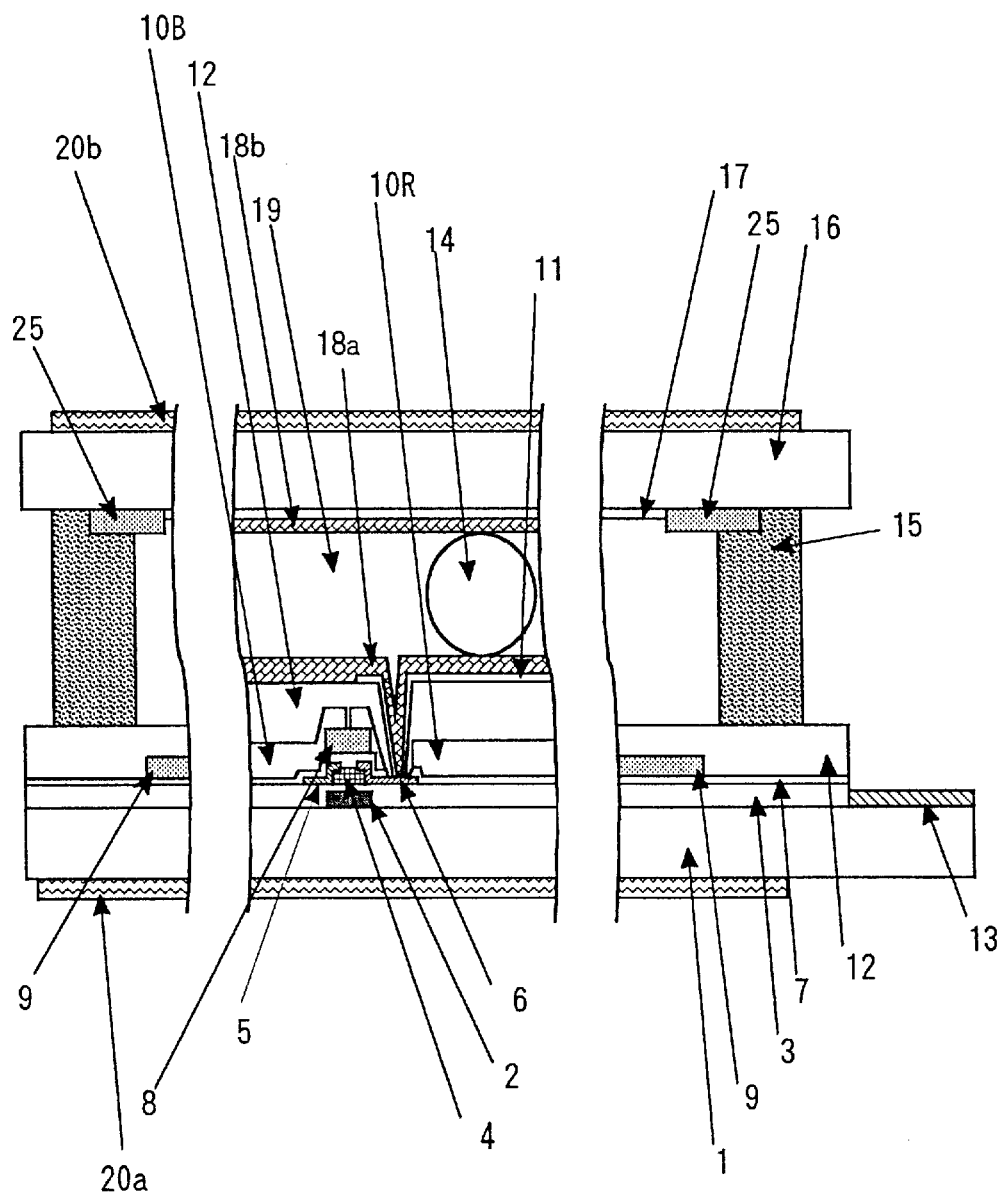
FIG. 9 is a schematic cross section showing a liquid-crystal panel according to the fourth embodiment.

Another embodiment will be described with respect to a means for preventing a leak of light from a substrate periphery. In this embodiment, a frame-shaped BM 25 is, as shown in FIG. 9, placed on the periphery of the second substrate 16. The structure of the first substrate comprising a TFT, a color filter and a black matrix is as described for the second embodiment which is shown in FIG. 4 or 6. The first substrate in FIG. 9 has the structure shown in FIG. 4. On the second substrate 16 is formed a frame-shaped BM 25 as described for the frame-shaped BM 9 on the first substrate. In the process, the inner periphery of the frame-shaped BM 25 is formed to vertically overlap with the frame-shaped BM 9 on the first substrate 1. The outer periphery of the frame-shaped BM 25 reaching the substrate edge may cause film peeling as is in the first substrate. It is, therefore, preferable, to form the BM 25 except in the area from the substrate edge to at least a half of the width of the sealer. Although the BM 25 is in contact with the sealer 15 in the structure shown in FIG. 9, the BM 25 may be coated with an appropriate material to improve its adhesiveness to the sealer. In this invention, a sealer with a shielding property as disclosed in JP-A 2-296223 or JP-A 5-88189 may be used.

Fifth Embodiment

The structure shown in FIG. 1 is most preferable for shielding in a substrate periphery. There will be, therefore, described a means for preventing film peeling in the area for a sealer without altering the structure.

Figure 10:
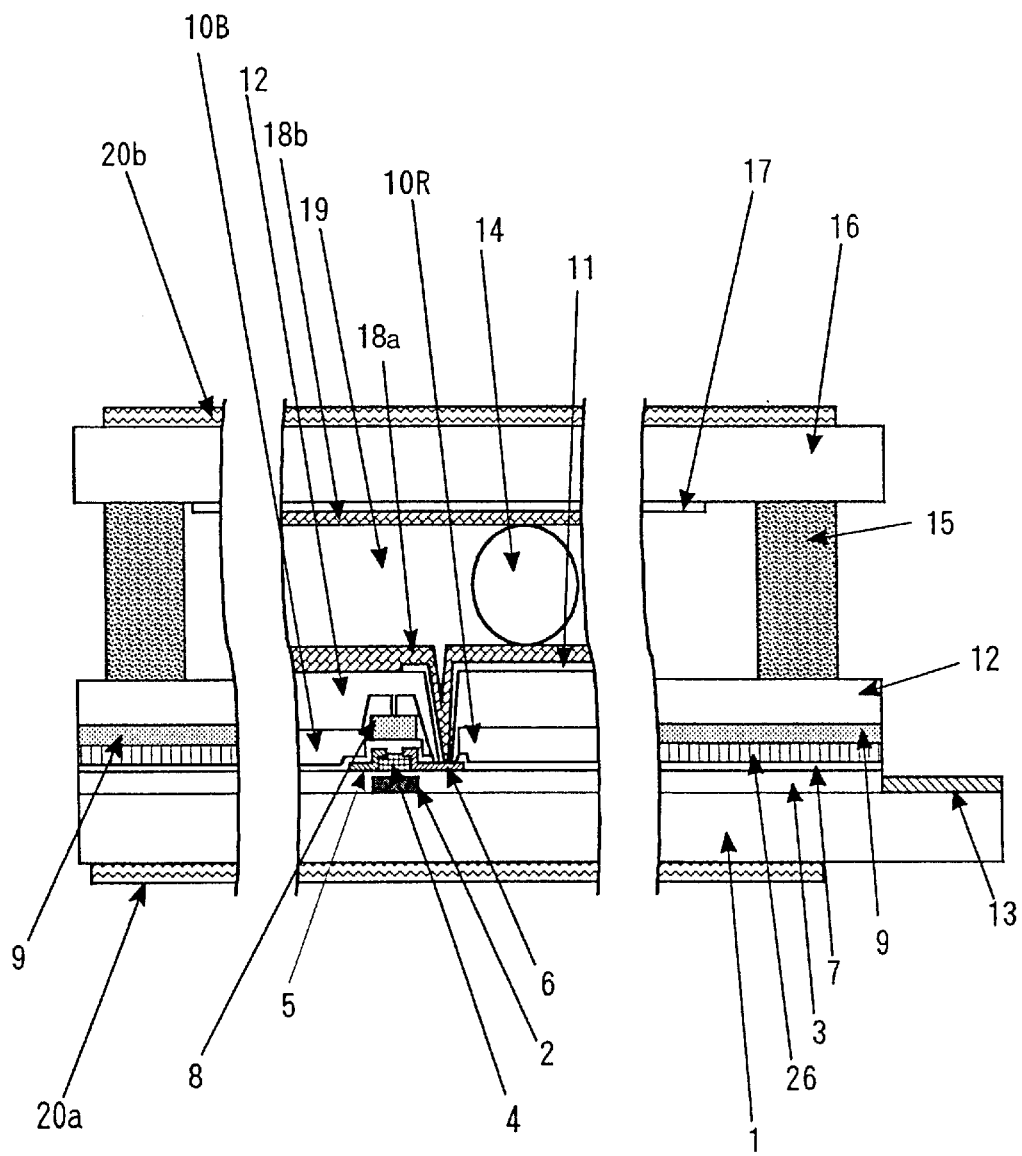
FIG. 10 is a schematic cross section showing a liquid-crystal panel according to the fifth embodiment.
Figure 11:
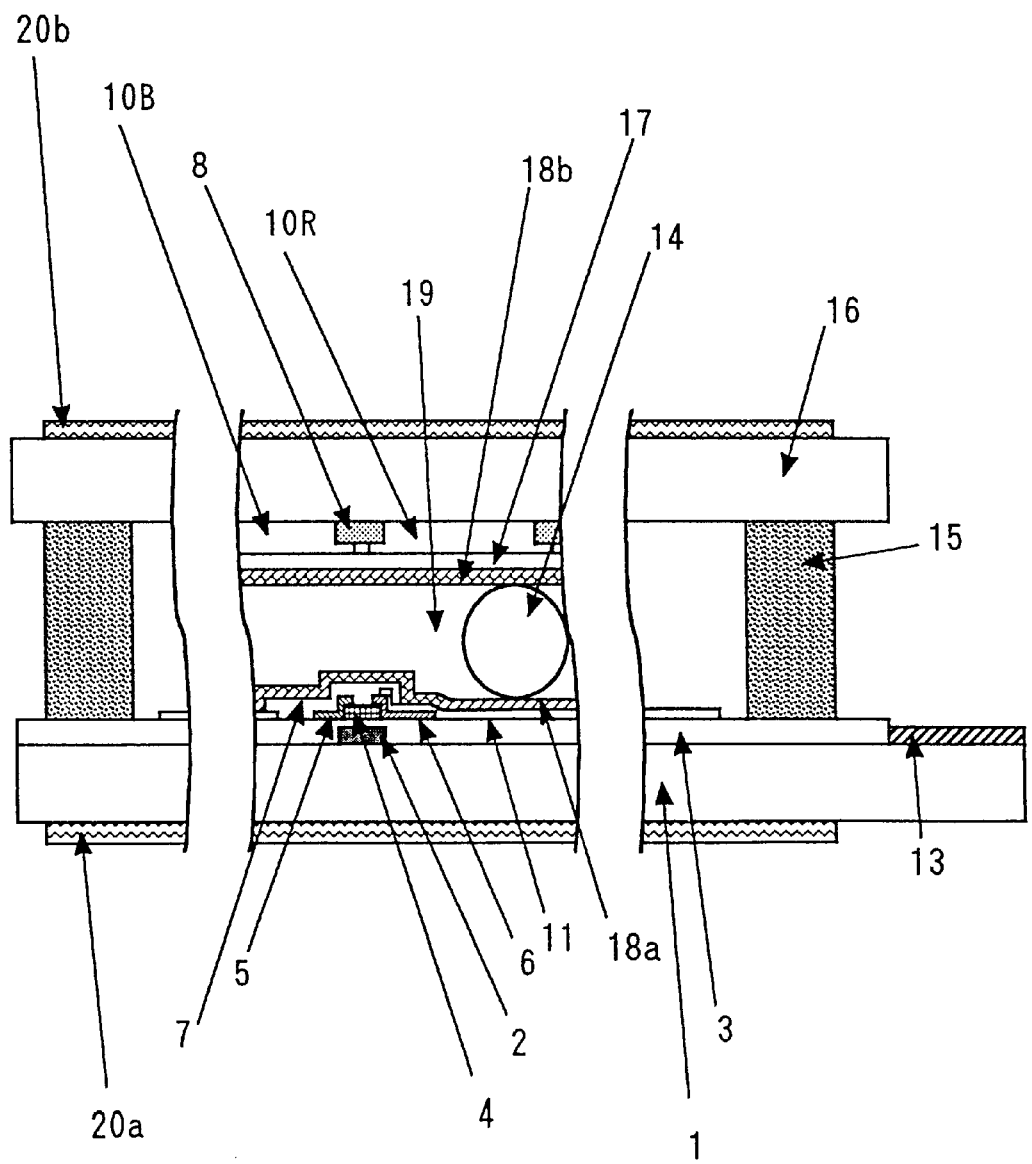
FIG. 11 is a schematic cross section showing a structure for a conventional liquid-crystal panel.

The structure in FIG. 10 is different from that in FIG. 1, in that a frame-shaped BM 9 is formed on a passivation film 7 via a coupling-agent layer 26. Such an intervening coupling-agent layer 26 may improve the adhessiveness of the frame-shaped BM 9 to prevent film peeling. The coupling-agent layer 26 may be formed by a known technique, for example, by applying a coupling agent when forming an oriented film on a transparent electrode. Although any coupling agent which can improve the adhesiveness of the passivation film to the frame-shaped BM may be used, a silane surface treatment agent (e.g., AP-400®, Toray) may be suitable in this invention. There are no limitations for the thickness of the coupling-agent layer 26, but it is preferably about 20 to 50 nm. A coupling-agent layer must be formed from the substrate edge to the area for a sealer, while for the inner area, it may have any width as long as it does not cover the display area, i.e., the area for forming a color filter.

As described above, forming a frame-shaped BM 9 to a substrate periphery may prevent a leak of light from the periphery, to provide a liquid-crystal panel with a good visibility. Furthermore, a coupling-agent layer may improve adhesiveness to prevent a leak of liquid crystal and bubble intrusion.

What is claimed is:

1. A color liquid-crystal panel comprising a first substrate having pixel electrodes on which are formed a thin-film transistor as a switching element for each pixel, which is covered by a passivation film, and a color filter layer and a black matrix on the passivation film, which are covered by an overcoat layer, and where the first substrate and a second substrate having a transparent common electrode facing the first substrate are put together via a sealer, forming an inner space which is filled with a liquid-crystal material, wherein a frame-shaped black matrix covers a periphery of the first substrate, wherein in the area for a sealer in the periphery of the first substrate, the frame-shaped black matrix is formed on the first substrate over the passivation film, except the area from the substrate edge to at least a half of the width of the sealer.

2. A color liquid-crystal panel as claimed in claim 1, wherein in the area for a sealer in the periphery of the first substrate, the frame-shaped black matrix is formed on the first substrate over the passivation film, inside the area for the sealer.

3. A color liquid-crystal panel as claimed in claim 2, where the sealer is applied directly to the passivation film of the first substrate.

4. A color liquid-crystal panel as claimed in claim 3, where a frame-shaped black matrix is formed at least in contact with the area for a sealer in the second substrate.

5. A color liquid-crystal panel as claimed in claim 2, where a frame-shaped black matrix is formed at least in contact with the area for a sealer in the second substrate.

6. A color liquid-crystal panel as claimed in claim 1, where the first and the second substrates are put together via a sealer before cutting the second substrate, and the transparent common electrode on the second substrate is formed inside of the cutting plane in cutting the second substrate.

7. A color liquid-crystal panel comprising a first substrate having pixel electrodes on which are formed a thin-film transistor as a switching element for each pixel, which is covered by a passivation film, and a color filter layer and a black matrix on the passivation film, which are covered by an overcoat layer, and where the first substrate and a second substrate having a transparent common electrode facing the first substrate are put together via a sealer, forming an inner space which is filled with a liquid-crystal material, wherein a frame-shaped black matrix covers a periphery of the first substrate, where the frame-shaped black matrix is formed on the passivation film via a coupling-agent layer.

8. A color liquid-crystal panel as claimed in claim 7, where the coupling agent is a silane surface treatment agent.

9. A color liquid-crystal panel as claimed in claim 8 where the transparent common electrode on the second substrate is formed inside the area for a sealer.

10. A process for manufacturing a color liquid-crystal panel, comprising the steps of forming a plurality of thin-film transistors and interconnection layers on a first substrate;

depositing a passivation film over the whole surface of the first substrate, covering the thin-film transistors and the interconnection layers;

forming a black matrix at least over semiconductor layers of the thin-film transistors and on the periphery of the substrate in the shape of a frame;

forming a color filter layer;

forming an overcoat layer over the whole surface of the first substrate, covering the black matrix and the color filter layer;

forming a contact hole in the overcoat layer and forming a pixel electrode;

applying a sealer on a periphery of the thin-film transistor side of the first substrate;

putting together the first substrate and a second substrate comprising a transparent common electrode via a sealer in a manner that the transparent common electrode faces the thin-film transistor side of the first substrate with a space therebetween; and injecting a liquid-crystal material into the space, wherein in the area for a sealer in the periphery of the first substrate, the black matrix is formed in the shape of a frame on the periphery of the first substrate, over the passivation film, except the area from the substrate edge to at least a half of the thickness of the sealer.

11. A process for manufacturing a color liquid-crystal panel as claimed in claim 10, wherein in the area for a sealer in the periphery of the first substrate, the black matrix is formed in the shape of a frame on the periphery of the first substrate, over the passivation film, inside the area for the sealer.

12. A process for manufacturing a color liquid-crystal panel as claimed in claim 11, where the sealer is applied directly to the passivation film of the first substrate.

13. A process for manufacturing a color liquid-crystal panel as claimed in claim 12, where a frame-shaped black matrix is formed at least in contact with the area for a sealer in the second substrate.

14. A process for manufacturing a color liquid-crystal panel as claimed in claim 11, where a frame-shaped black matrix is formed at least in contact with the area for a sealer in the second substrate.

15. A process for manufacturing a color liquid-crystal panel, comprising the steps of forming a plurality of thin-film transistors and interconnection layers on a first substrate;

depositing a passivation film over the whole surface of the first substrate, covering the thin-film transistors and the interconnection layers;

forming a black matrix at least over semiconductor layers of the thin-film transistors and on the periphery of the substrate in the shape of a frame;

forming a color filter layer;

forming an overcoat layer over the whole surface of the first substrate, covering the black matrix and the color filter layer;

forming a contact hole in the overcoat layer and forming a pixel electrode;

applying a sealer on a periphery of the thin-film transistor side of the first substrate;

putting together the first substrate and a second substrate comprising a transparent common electrode via a sealer in a manner that the transparent common electrode faces the thin-film transistor side of the first substrate with a space therebetween; and injecting a liquid-crystal material into the space, where the black matrix formed in the shape of a frame on the periphery of the first substrate is formed on the passivation film via a coupling-agent layer.

16. A process for manufacturing a color liquid-crystal panel as claimed in claim 15, where the coupling agent is a silane surface treatment agent.

17. A process for manufacturing a color liquid-crystal panel, comprising the steps of forming a plurality of thin-film transistors and interconnection layers on a first substrate;

depositing a passivation film over the whole surface of the first substrate, covering the thin-film transistors and the interconnection layers;

forming a black matrix at least over semiconductor layers of the thin-film transistors and on the periphery of the substrate in the shape of a frame;

forming a color filter layer;

forming an overcoat layer over the whole surface of the first substrate, covering the black matrix and the color filter layer;

forming a contact hole in the overcoat layer and forming a pixel electrode;

applying a sealer on a periphery of the thin-film transistor side of the first substrate;

putting together the first substrate and a second substrate comprising a transparent common electrode via a sealer in a manner that the transparent common electrode faces the thin-film transistor side of the first substrate with a space therebetween; and injecting a liquid-crystal material into the space, where the first and the second substrates are put together via a sealer before cutting the second substrate, and the transparent common electrode on the second substrate is formed inside of the cutting plane in cutting the second substrate.

18. A process for manufacturing a color liquid-crystal panel as claimed in claim 17, where the transparent common electrode on the second substrate is formed inside the area for a sealer.

* * * * *